United States Patent [19]

Motts

[11] Patent Number: 4,967,983
[45] Date of Patent: Nov. 6, 1990

[54] AIRSHIP

[76] Inventor: Brian C. Motts, 42 Meadowgrass, Irvine, Calif. 92714

[21] Appl. No.: 360,457

[22] Filed: Jun. 2, 1989

[51] Int. Cl.$^5$ ............................................. B64B 1/02
[52] U.S. Cl. ................................... 244/30; 244/125; 244/36; 244/34 A; 244/29; 136/292
[58] Field of Search ...................... 244/29, 30, 125, 36, 244/34 A, 12 G, 25, 58, 53 R; 136/292

[56] References Cited

U.S. PATENT DOCUMENTS

| | | | |
|---|---|---|---|
| 1,873,505 | 8/1932 | Stipa | 244/36 |
| 2,083,051 | 3/1937 | Chapas | 244/125 |
| 4,364,532 | 12/1982 | Stark | 244/30 |
| 4,726,546 | 2/1988 | De Angelis | 244/36 |
| 4,768,738 | 9/1988 | Weinert | 244/58 |

FOREIGN PATENT DOCUMENTS 1322406  2/1963  France .................................. 244/29

*Primary Examiner*—Sherman D. Basinger
*Assistant Examiner*—Christopher P. Ellis
*Attorney, Agent, or Firm*—Roger A. Marrs

[57] ABSTRACT

A rigid airship is disclosed herein having an annular or toroidal airfoil fuselage in front elevation for housing several elongated gas cells containing a buoyant gas such as helium. The fuselage includes at least two longitudinal and a plurality of transverse structural members for supporting the cells. A covering is provided about the fuselage comprising a multiplicity of fitted panels joined by retainer straps and locking nodes. The fuselage defines a central venturi having an annular intake and a contracted exit through which an elongated tapered tail cone extends in coaxial relationship with the fuselage. Boundary layer control is effected via manifolds associated with the fuselage panels and a variable geometry venturi passageway is effected by longitudinal movement of a control compartment and adjoining tapered tail cone. Propulsion apparatus is carried after the venturi contraction and an electrical power regeneration and storage system is integrated with electrodes carried on the panels for electrokinetic propulsion.

16 Claims, 3 Drawing Sheets

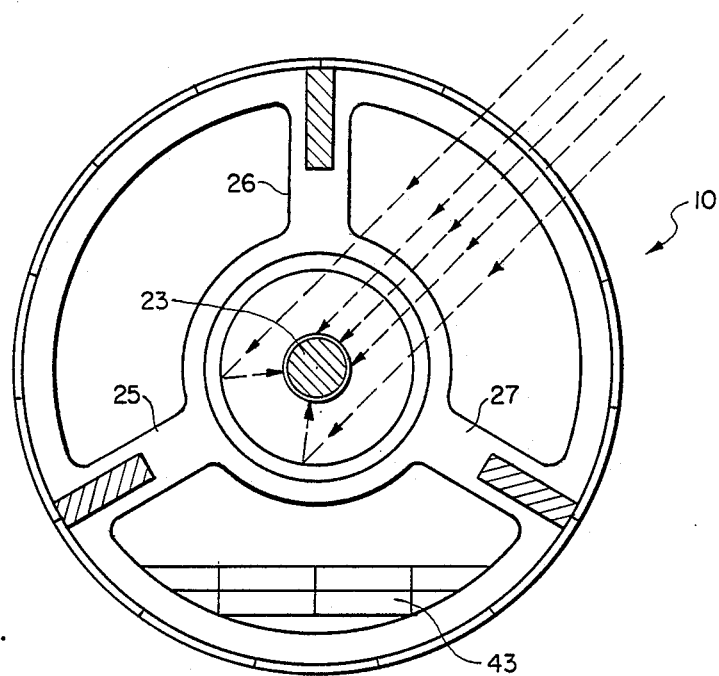
FIG. 5.
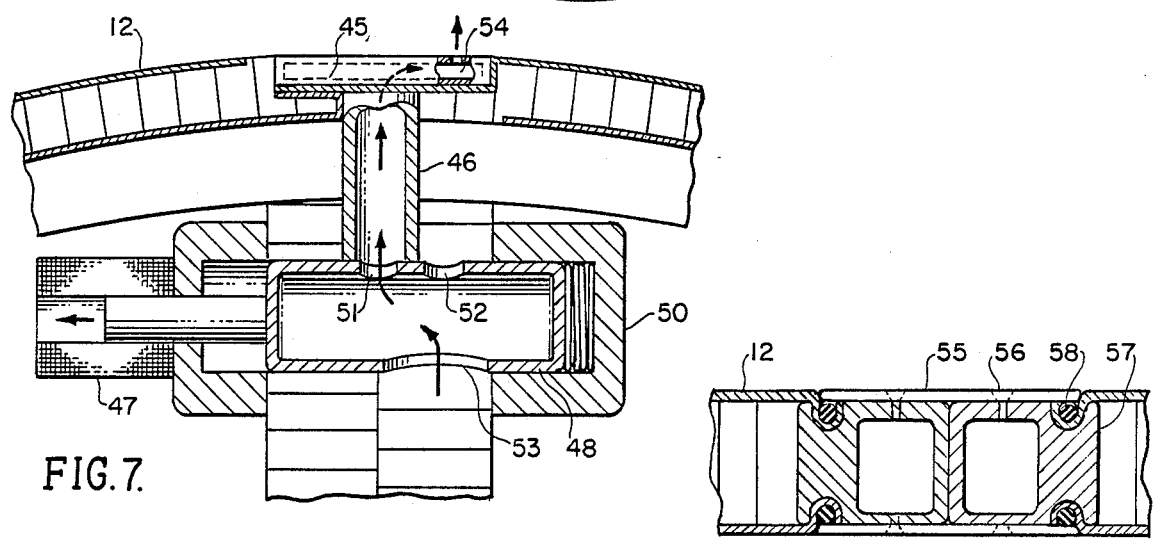
FIG. 7.
FIG. 8.
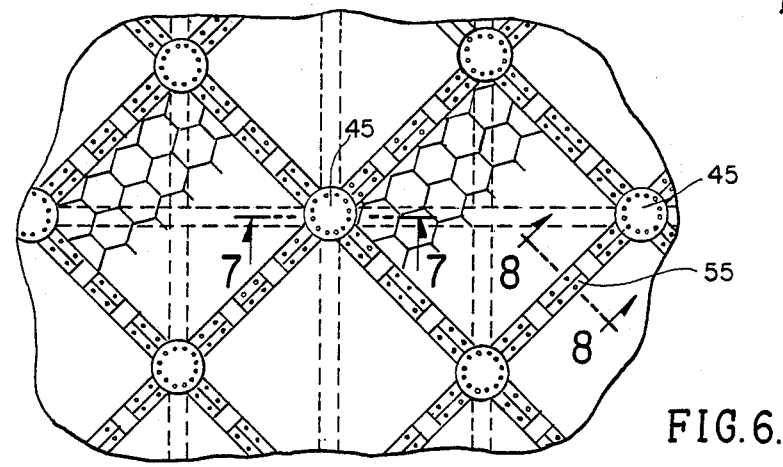
FIG. 6.

AIRSHIP

BACKGROUND OF THE INVENTION

1. Field of the Invention

The present invention relates to the field of aero-lift-augmented airships and more particularly to such an airship deriving aerodynamic lift and speed via air flow through a variable geometry central venturi provided in an elongated annular airfoil hull or fuselage.

2. Brief Description of the Prior Art

Conventionally, lighter-than-air airships have been designed with elongated cigar-shaped hulls or fuselages enclosing buoyant gas-filled cells for lift and having engines for propulsion attached along the sides of the hull or fuselage, at the control compartment or at the stern of the airship. When this configuration of airship displaces a mass of air to the side due to its forward motion, the displaced air will eventually return near the stern of the airship exerting compressive force on the fuselage tail structure. This increased pressure requires a stronger and therefore a heavier supporting structure which results in increased weight and payload reduction.

Furthermore, some prior airships combine aerodynamic lifting with buoyant lifting in an attempt, primarily, to gain airspeed and improve payload capacity. Such aero-lift-augmented airships derive aerodynamic lift either integrally through high-lifting hull configurations or externally through the addition of special lifting surfaces or airfoils on an otherwise conventional appearing hull or fuselage.

However, such hybrid additions introduced increased structural weight as well as hull/lifting surface interference drag.

Therefore, a long standing need exists to provide a novel airship which gains airspeed and payload capacity by employing an augmented fuselage configuration without airfoil addition or increased propulsion on ordinary airship design.

SUMMARY OF THE INVENTION

Accordingly, the above problems and difficulties are resolved by the present invention which provides a self-propelled airship having an elongated annular airfoil fuselage comprised of at least two longitudinal and a plurality of transverse structural members housing cells for holding a buoyant gas and defining a central venturi between an inlet and an outlet through which a central longitudinal structural member extends in coaxial relationship with the fuselage. A control compartment attached on one end of the structural member which is movably carried so as to provide a variable geometry to the venturi and a propulsion means includes an engine operably carried on the opposite end of the structural member. Support members connect the control compartment and longitudinal structural members to the surrounding annular fuselage.

A plurality of interlocking panels constitute a covering for the fuselage and propulsion is augmented by further providing boundary layer control means as well as providing an electrical power regeneration and storage system means for electrokinetic propulsion. Such means includes requisite heat exchangers and electrodes operably carried on the fuselage panels or covering, etc.

Therefore, it is a general aim of the present invention to provide a novel and unique self-propelled airship having an elongated annular airfoil fuselage with a variable geometry central venturi passageway which has modular components that simplify its design, construction and maintainability.

Another object of the present invention is to provide an airship which has superior characteristics and is relatively inexpensive to manufacture and operate.

Another object resides in providing such an annular airship with means for varying the geometry of the central venturi passageway so that a stable boundary layer is maintained and to create a variable bypass ratio.

Yet another item of the present invention is to provide stability and control derived from longitudinal control surface structural members which connect a control compartment to the annular fuselage, and by movable vertical and horizontal electrode control surfaces within the central venturi passageway near the aft outlet of the airship.

Still a further object of the present invention is to provide a novel self-propelled airship having buoyant lifting means incorporated into an elongated annular fuselage defining an open-ended central venturi passageway with a variable geometry. Propulsion and lifting is augmented by electrokinetic elements in combination with a power plant and by a thermionic electrode means operable to absorb radiant heat for raising venturi passageway temperature.

Still another object resides in providing airship ballast and trim by use of ballast cells containing a releasable ballast material or substance and by employing a variable inlet means at the forward end of the central venturi passageway which includes a displaceable control compartment and adjoining tapered tail cone effecting the airship center of gravity.

Another object of the invention resides in the provision of a self-propelled airship combining aerodynamic lifting means with both buoyant lifting means and special lifting surfaces to gain airspeed and improve payload capacity.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood with reference to the following description, taken in connection with the accompanying drawings in which:

FIG. 5 is a transverse cross-sectional view of the airship fuselage shown in FIG. 2 as taken in the direction of arrows 5—5 thereof;

FIG. 6 is an enlarged plan view of the airship fuselage covering panels and interlocking nodes;

FIG. 7 is a sectional view of an interlocking node taken in the direction of arrows 7—7 of FIG. 6; and FIG. 8 is a sectional view of a retainer plate shown in FIG. 6 taken in the direction of arrows 8—8 thereof.

DESCRIPTION OF THE PREFERRED EMBODIMENT

Figure 1:
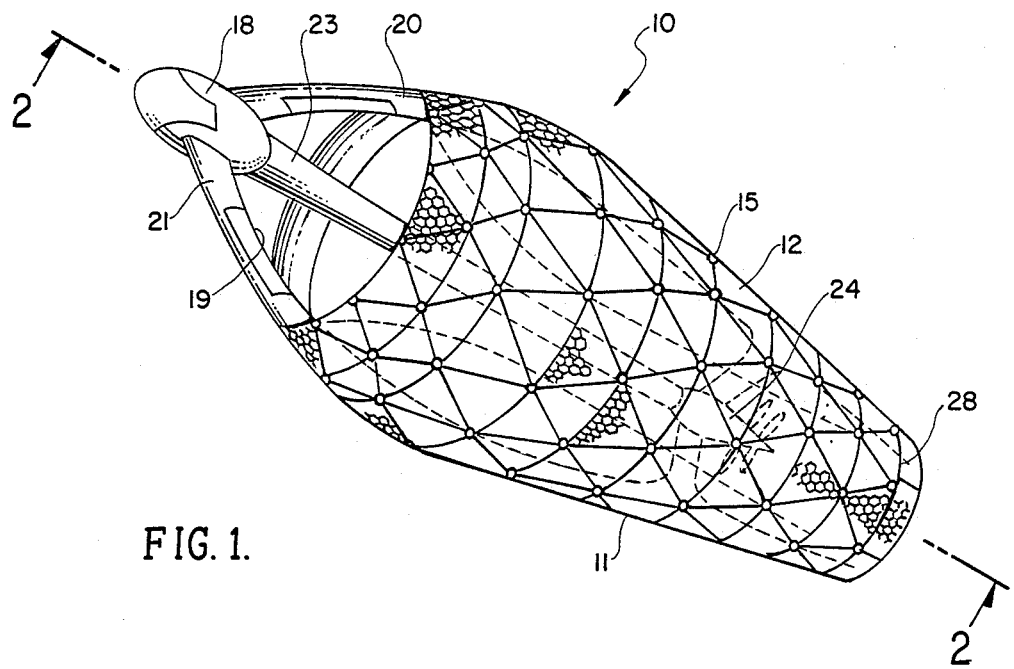
FIG. 1 is a perspective view of an annular self-propelled airship employing the inventive concept.

Referring to FIG. 1, a self-propelled rigid airship is illustrated in the general direction of arrow 10 which includes an elongated annular airfoil fuselage 11 employing a covering of a plurality of specialized panels, such as panel 12. Buoyancy is provided by a lifting gas, such as helium, contained within several gas cells enclosed by the fuselage, as noted by reference numeral 14 in FIG. 2. Adjacent panels in the covering are attached by locking nodes 15 to transverse structural members 17 which form an integral interconnection means for operably supporting electrokinetic power regeneration and capacitor elements (to be described later). A control compartment 18 and a rearwardly extending tapered thermionic tail cone 23 are movably connected to longitudinal control structural members 20, 21 and 22. The tail cone 23 is coaxially disposed with respect to the annular fuselage and movably attaches at its aft end to a power plant pod 24 which in turn is carried by an aft longitudinal structural support having outwardly radiating support members 25, 26 and 27.

Control surfaces 19 are carried on the forward support structural members 20, 21 and 22, while movable aft control surfaces 28 are carried on the aft end of the fuselage.

Figure 2:
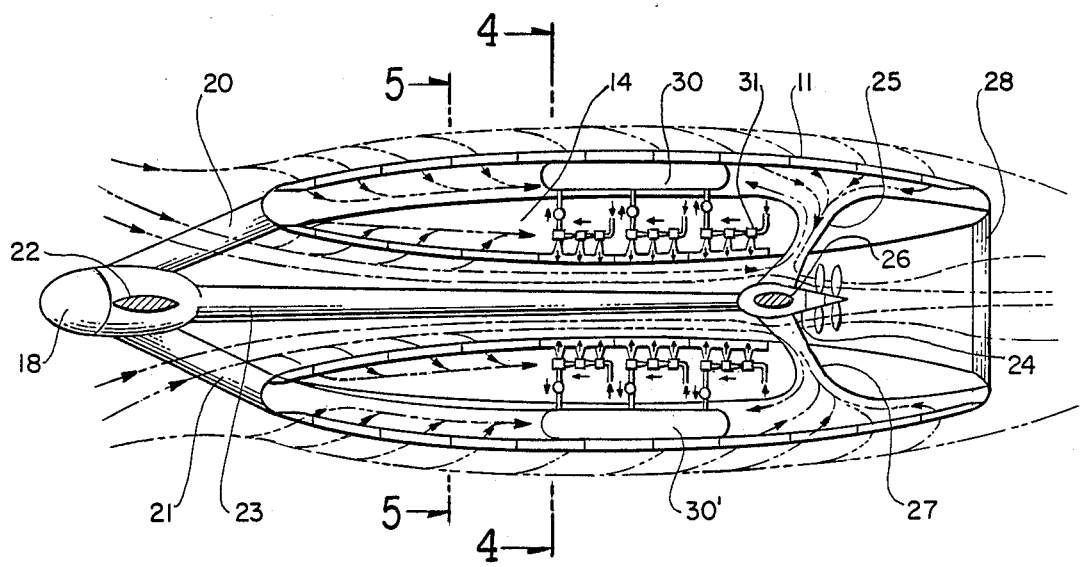
FIG. 2 is a longitudinal cross-sectional view showing boundary layer control, vortex tubes and heat exchanger elements used in the airship of FIG. 1.

Referring now in detail to FIG. 2, it can be seen that the elongated annular fuselage 11 includes a central venturi passageway extending between its opposite ends so as to define an inlet immediately behind the control compartment 18 and a outlet immediately rearward of the aft power plant pod 24. The venturi is established by providing that the inlet is of a diameter greater than the diameter of the central passageway and the outlet is of a greater diameter than the central passageway. Therefore, as ram air enters the inlet it is compressed in the center of the passageway and allowed to expand via the outlet. In so doing, the propulsion of the overall vehicle is augmented in addition to the power plant contained within the pod 24.

The respective gas cells 14 are constructed to hold a pressurized gas which is provided from helium pressure tanks, such as tank 30 associated with cell 14. Gas is supplied to the respective tanks via a control system indicated by numeral 39. Such a system further includes vortex tubes. The vortex tubes are employed in connection with a heat exchanger means which is effected through manifolds that are integral with the transverse and longitudinal structural members and the panels 12.

By having an active boundary layer control means, it is possible to vary the pressure distribution and thereby vary the velocity distribution over any individual panel or group of panels on the airship 10. Such distribution and varying control is achieved by actuating only a single solenoid-operated valve per panel which is illustrated more clearly in FIG. 6 to be described later.

While still referring to FIG. 2, it is important to emphasize the inventive concept that the airship overcomes the weaknesses inherent with previous airship configurations which used an elongated fuselage by allowing a flow of air through a variable central venturi passageway. This feature provides many benefits that were not possible in previous designs. For example, the flow about the outside of the airship will compress mostly on the flow which moves or exhausts from the venturi through the outlet. The elongated annular airfoil fuselage has a greater volumetric efficiency over non-annular elongated hulls or fuselages by more than a factor of 10%, as indicated in the following comparison. Given an elongated annular airship as substantially shown in the view of FIG. 2, with an overall length of 180 feet and a toroidal hull or fuselage comprising 150 feet of the total length, there is a venturi with an average radii of 12.5 feet and an average of 25 feet for the external radii, then the volume displaced by this configuration would be approximately equal to the differences between the two radii squared times $P1(\pi)$ times the length of the hull or fuselage.

$$V_T = \pi(R_1^2 - R_2^2) \cdot L$$

$$V_T = \pi(25^2 - 12.5^2) \cdot 150$$

$$V_T = 220,893 - FT^3$$

By way of comparison, a non-annular elongated airship must provide a streamlined shape in order to reduce aerodynamic drag. The streamlining eliminates volumes that are usable by the annular hull or fuselage configuration. A non-annular elongated airship with the same fuselage length and width would only furnish a volume of less than 200,000 $FT^3$.

Figure 3:
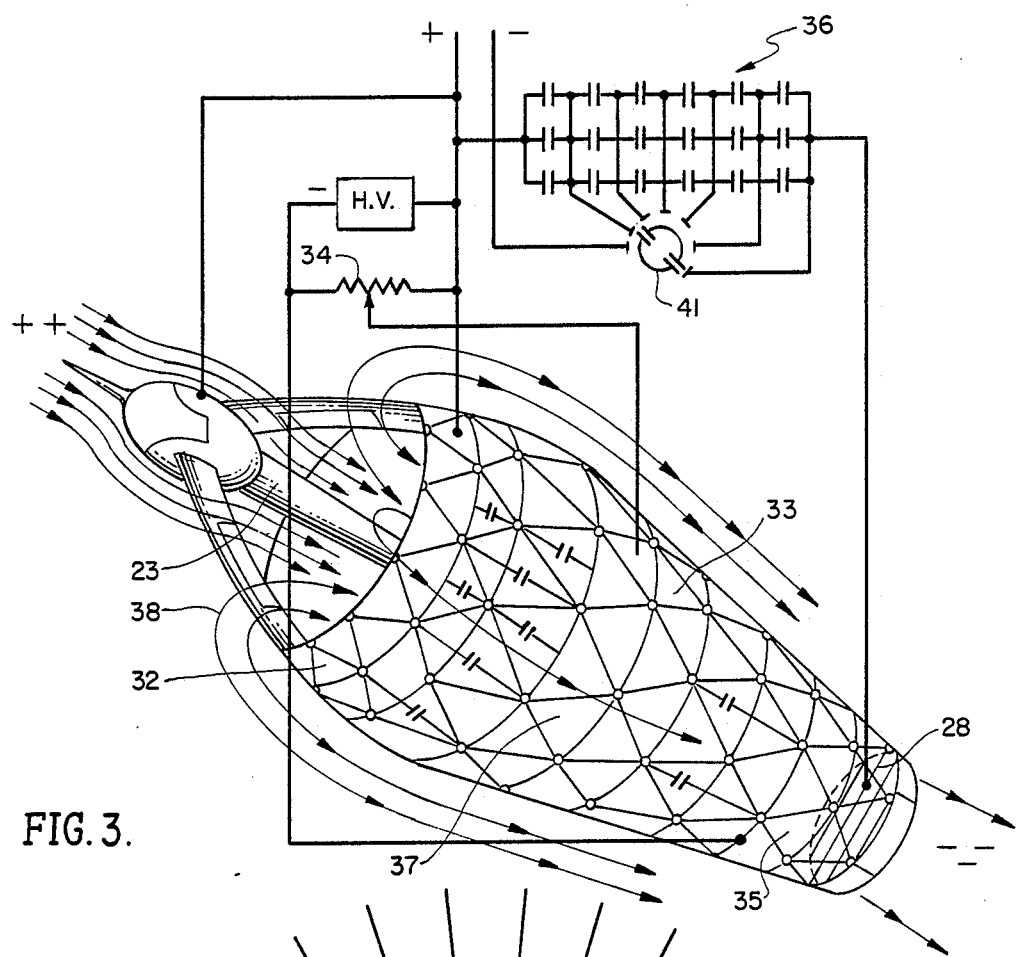
FIG. 3 is a view similar to the view of FIG. 1 diagrammatically illustrating capacitor and electrode panels used as electrokinetic elements for augmenting airship propulsion.

FIG. 3 represents an isometric schematic diagram depicting the regenerative electrokinetic propulsion system employed to augment the propulsion system along with a boundary layer control system and heat exchange system. The airship 10 operates by several of these modes of propulsive force.

As illustrated in FIG. 3, the airship 10 contains various electrodes that are an integral and inseparable part of the panels 12 that form the covering for the annular hull or fuselage. The leading edge or inlet of the fuselage is comprised of the highest positive DC potential electrode panels, indicated by numeral 32, that are subsequently the least in surface area relative to the other electrode panels. The electrode panels represent a divergent series with respect to increasing negativity and increasing surface area.

The motion of the airship is in the direction of the most positive electrode with velocity dependent on the amount of voltage stress placed on the electrodes within a particular dielectric fluid like air. By varying the voltage potential on the midship electrode panels 33 and leading edge panels by resistor element 34, it is possible to throttle the speed of the airship 10.

The trailing edge or outlet electrode panels 35 are the most negative and contain the largest surface area. The electode layout within the venturi passageway coincides with the electrode layout on the exterior of the airship.

Capacitors 36 are arranged in a parallel-series combination such that the transverse structural members interconnect the parallel circuit and longitudinal structural members interconnect the series circuit. The capacitors are spaced adjacent said electrode panels 37 having both electrode and capacitor elements.

Figure 4:
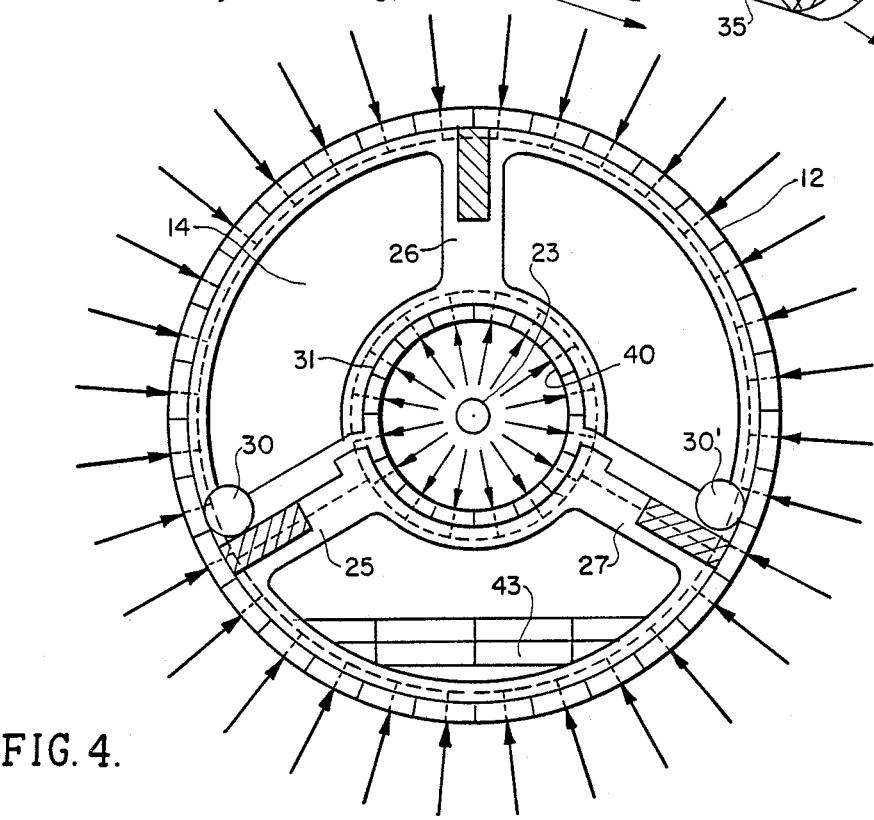
FIG. 4 is a transverse cross-sectional view of the airship fuselage taken in the direction of arrows 4—4 of FIG. 2.

When concoming ram air enters the venturi or moves around the inlet of the fuselage, it will move along differential electrostatic force lines 38 that impart relative motion to the dielectric fluid medium being stressed. The larger the voltage differential impressed onto electrodes, the greater the propulsive force that is generated. Thermionic tail cone electrode 23 is at a negative DC potential. So when sunlight enters through transparent capacitor and electrode panels and reflects off of venturi mirrored capacitor and electrode panels 40 (FIG. 4) onto electrode 23, the concentrated sunlight heats said electrode into thermionic emission. This will convert the sun's energy directly into kinetic energy. Some of the negative ions generated by the thermionic emission will be collected by movable vertical and horizontal electrode surfaces 28 located within the venturi near the outlet of the airship This will cause electrode surfaces 28 to become increasingly negative and the leading electrodes 32 to become increasingly positive unless current is drawn from the circuit.

The capacitors store energy that is transferred to them by commutator 41 for increasing charge accumulated on electrode surfaces 28. There is also a source of high voltage DC 30 necessary to start the electrokinetodynamic cycle.

The airship of this invention has a total equivalent stored energy within said capacitor panels given by the standard formula $$W = \frac{V^2 C}{2}$$

where
W = Energy in joules (watt seconds)
V = Potential in volts
C = Capacitance in farads For example: An airship having an overall length of 180' with 150' length for the elongated annular envelope, such that a venturi with an average radii of 12.5' and the external envelope with an average radii of 25' contain capacitor panels equal to 100' of said envelope length, then the total surface area to be used by capacitors is given by the equation.

$$A_T = 2\pi R_1 \times L + 2\pi R_2 \times L$$

$A_T$ = area total in square feet
where
$R_1$ = average envelope radius
$R_2$ = average venturi radius
$L$ = length to calculate $$A_T = 2\pi(25 \times 1000) + 2\pi(12.5 \times 100)$$

$A_T = 15,708 + 7,854$
$A_T = 23,562$ FT$^2$

If each capacitor panel is 25 FT$^2$ then there would be a total of 942 capacitor panels. The total equivalent capacitance for the example airship is 0.015 MF based on a helium dielectric @0.25 SP. When a potential differential of 10,000,000 volts exists between electrodes 32 and 35, the stored energy would be equal to 750,000 joules.

Additional temperature rise within the venturi is achieved by means of heat exchangers 31 that cycle heated lifting gases from vortex tubes. The vortex tubes also serve to super cool the lifting gases as the increased internal pressure on the fuselage due to altitude changes is valved through a series of vortex tubes. The reduced temperature of the gas allows a smaller volume to be occupied by the gas. This feature eliminates the need for venting. The supercooled lifting gas is compressed into storage tanks or devices 30 for later use when lower altitude flight is desired. However, in order to maintain buoyancy at higher altitudes, it is necessary to displace larger volumes of air within the gas cells. The airship of this invention becomes heavier than air above its maximum static lift ceiling and relies on the dynamic lift generated by its forward motion and large annular fuselage airfoil.

Referring now in detail to FIG. 7, means are illustrated for joining the respective panels together, as well as providing an operable boundary layer control system. The connecting or joining means includes a node 45 having an elongated stem 46 that downwardly extends between adjacent edge marginal regions of the panel to terminate adjacent a solenoid-operated valve. The valve includes an electromagnetic coil 47 which when energized, causes a valve 48 to move linearly within a housing 50. The valve 48 includes a pair of orifices 51 and 52 with a single orifice 53. Negative or positive pressure is introduced into the boundary layer control system via the orifice 53 and through the hollow valve for moving through the interior of the stem 46 for suction or discharge via a cavity 54 for distribution about the external surface of the panel 12. The active boundary layer control may vary the pressure distribution so that the velocity distribution is varied over any individual panel or group of panels on the airship by actuation of only one solenoid valve per panel. Pressure for distribution through the boundary layer control valve is effected via manifolds that are integral with the transverse and longitudinal structural members and the panels themselves.

FIGS. 6 and 8 show the arrangement of a plurality of nodes 45 and that the edge marginal regions of the panels are connected together by a retainer plate, as indicated by numeral 55. As seen more clearly in FIG. 8, the retainer plates are held in position by means of fasteners, such as fastener 56, and the panels are held together beneath the retainer plates by means of manifold structure 57 having grooves for receiving locking members, such as illustrated by numeral 58. The locking members fit into the respective receptacles provided on the ends of the plates 12 which are disposed within the groove of the structural member 57. Next, the retaining locking member 58 is inserted into the recess or receptacle which is then followed by installation of the retaining plates 55 on the upper and underside of the assembly or construction. It should also be noted that the respective panels may be formed with a honeycomb construction which may contain a helium dielectric gas.

For utility purposes, the fuselage or hull 10 may include a cargo and passenger section, as indicated by numeral 43 in FIG. 5. Also, other accommodations such as wheels, skids and other functional apparatus may be included as being within the concept of the present invention.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:
1. A self-propelled rigid airship comprising:
   an elongated annular airfoil fuselage having an open-ended central passageway extending between its opposite ends;

said central passageway constituting a venturi having an annular inlet at one end of said fuselage and an annular outlet at the other end of the fuselage;

an elongated tail cone disposed in said venturi in coaxial relationship with said annular fuselage and having a forward end carrying a control compartment ahead of said inlet and a rear end carrying a propulsion apparatus adjacent said outlet;

structural member supporting said tail cone and control compartment from said fuselage; and means disposed in said fuselage constituting a buoyant gas means operable for altitude control of said fuselage.

2. The invention as defined in claim 1 including:

said populsion apparatus having a conventional power plant and further including an electrokinetic propulsion means having an electrical power regeneration and storage system operably coupled to said conventional power plant for propulsion augmentation.

3. The invention as defined in claim 2 wherein:

said fuselage includes an exterior covering comprising a plurality of adjoining panels.

4. The invention as defined in claim 3 including:

electrode means carried on said fuselage panels operable in said electrokinetic propulsion means to establish a capacitance energy charge transferable to said electrokinetic propulsion means.

5. The invention as defined in claim 3 including:

a boundary layer control means carried by said panels for varying the pressure distribution and therefore the velocity distribution.

6. The invention as defined in claim 3 including:

a heat exchanger system carried on said fuselage operable in cooperation with said panels to radiate heat for raising venturi passageway temperature.

7. The invention as defined in claim 4 including:

reflector panels disposed along said central venturi facing said elongated tapered tail cone constituting a thermionic electrode for absorbing radiant heat of sunlight.

8. The invention as defined in claim 7 wherein:

said reflector panels are mirrors heating the said tail cone; and selected ones of said fuselage covering panels are transparent to radiant heat derived from sunlight.

9. A self-propelled rigid airship comprising:

an elongated annular airfoil fuselage having a forward end leading rearwardly in an exterior taper to terminate in a reduced aft end;

said fuselage having a central open-ended passageway between said forward end and said aft end lying along its central longitudinal axis and coaxial therewith to establish a venturi for receiving oncoming ram air via said forward end;

support structure means carried by said fuselage forward of and within said venturi supporting a control means adjacent to and ahead of said fuselage forward end and a propulsion means adjacent to said aft end; and lifting means incorporated with said fuselage providing a buoyant lift for altitude control of said fuselage.

10. The invention as defined in claim 9 wherein:

said lifting means includes a buoyant gas means having storage gas cells, pressure tanks coupled thereto and control means operably connected to said tanks for controlling said buoyant gas therebetween.

11. The invention as defined in claim 9 wherein:

said fuselage passageway includes an inlet leading into said venturi and an outlet existing said venturi.

12. The invention as defined in claim 11 including:

means operably carried between said fuselage and said control means for varying the geometry of said venturi.

13. The invention as defined in claim 12 wherein:

said varying means includes an elongated tapered tail cone extending between said control means and said propulsion means.

14. The invention as defined in claim 9 wherein:

said support structure means includes at least two longitudinal and a plurality of transverse support members.

15. The invention as defined in claim 9 including:

a boundary layer control means carried on the exterior of said fuselage for varying the pressure distribution and the velocity distribution; and said boundary layer control means includes means for selectively varying exterior fuselage pressure.

16. The invention as defined in claim 15 wherein:

said boundary layer control varying means includes a multiplicity of solenoid-operated valves adapted to create a suction about said fuselage exterior or to discharge an airflow so that the velocity distribution is varied over any individual one of said panels.

* * * * *